United States Patent [19]
Southard, Jr.

[11] 3,942,208
[45] Mar. 9, 1976

[54] ROTARY CLEANING DEVICE

[75] Inventor: Archie F. Southard, Jr., Bristow, Okla.

[73] Assignee: Frank D. Chapman, Bristow, Okla.; a part interest

[22] Filed: Sept. 26, 1974

[21] Appl. No.: 509,655

[52] U.S. Cl.......... 15/104.01 R; 15/236 B; 29/81 J; 125/5
[51] Int. Cl.²...................... B23D 79/04; F23J 1/00
[58] Field of Search............. 15/104.01 R, 104.01 P, 15/180, 198, 200, 236 NO; 29/81 D, 81 E, 81 G, 81 J, 81 L; 51/395, 376; 144/115; 119/91, 93; 128/56; 125/5

[56] References Cited
UNITED STATES PATENTS

| | | | |
|---|---|---|---|
| 902,732 | 11/1908 | Horn | 144/115 UX |
| 1,516,587 | 11/1924 | Blanch | 15/198 |
| 1,656,237 | 1/1928 | Rodgers | 15/180 |
| 1,829,531 | 10/1931 | Neilsen | 144/115 |
| 2,101,394 | 12/1937 | Johnson | 15/28 |
| 2,441,682 | 5/1948 | Wybrants | 15/186 X |
| 2,716,314 | 8/1955 | Upham | 29/81 D X |
| 3,722,022 | 3/1973 | Falleson | 15/236 NO |

FOREIGN PATENTS OR APPLICATIONS

| | | | |
|---|---|---|---|
| 1,021,082 | 11/1952 | France | 15/180 |
| 457,744 | 1/1950 | Italy | 15/180 |

*Primary Examiner*—Daniel Blum
*Attorney, Agent, or Firm*—William S. Dorman

[57] ABSTRACT

A rotary cleaning device comprising a cup-shaped rotatable base member, a cylindrical resilient mounting received in the cup-shaped member, a plurality of elongated cleaning elements essentially in the form of wood screws mounted in the resilient mounting and extending through and beyond the same. The heads of the screws are positioned between the resilient mounting and the cup-shaped base member. A bolt having an enlarged head extends substantially centrally through the resilient mounting and the base member in a direction opposite from the extension of the cleaning elements. Nuts are mounted on the bolt and engagable with the base member to hold the assembly together in such manner that the heads of the screws are firmly grasped between the resilient mounting and the base member. The portion of the bolt which extends beyond the nuts constitutes a shank which is adapted to engage a rotary chuck for rotating the cleaning device. The points of the screws constitute a primary cleaning means and the threads of the screws constitute a secondary lateral cleaning means.

1 Claim, 2 Drawing Figures

ROTARY CLEANING DEVICE

BACKGROUND OF THE INVENTION

1. Field of the Invention

The present invention relates to a rotary cleaning device and, in particular, to a cleaning device wherein the cleaning elements are supported in a resilient mounting.

2. Description of the Prior Art

The present invention is particularly designed, but not necessarily limited to, the removal of carbon from the cylinders of internal combustion engines and for similar purposes. Generally stated, prior art devices used for the same or similar purposes have been in the form of rotary wire brushes. Fletcher U.S. Pat. No. 1,497,899 issued June 17, 1924, and Albertson U.S. Pat. No. 1,526,579 issued Feb. 17, 1927, are typical patents showing the use of wire brushes for cleaning carbon and other materials from the cylinders of internal combustion engines and other surfaces. One of the difficulties involved in the use of wire brushes, however, is that the bristles thereof become bent, broken and worn such that the device becomes considerably less effective after a period of use.

SUMMARY OF THE INVENTION

The present invention constitutes an improvement over the rotary cleaning device of the wire brush type. The present invention involves a plurality of rigid and elongated cleaning elements mounted in a resilient mounting such as of rubber. The elongated cleaning elements can, for example, be wood screws which extend through and beyond the resilient mounting in substantially parallel relationship with each other. The resilient mounting is preferably in the form of a resilient cylinder which is attached to a rotatable base member. The base member, in turn, is preferably in the form of a cup in which the resilient cylinder is received in such manner that the heads of the wood screws are grasped between the bottom of the cup-shaped base member and the adjacent surface of the resilient cylinder. A bolt extends substantially centrally through the resilient cylinder and the cup-shaped base member in a direction opposite from the pointed ends of the wood screws. The head of the bolt is in engagement with the resilient cylinder. A first nut is mounted on the bolt and engagable with the outside of the cup-shaped base member so as to provide a means for tightening the resilient cylinder into engagement with the base member whereby the heads of the cleaning elements are firmly grasped between the resilient cylinder and the base member. The wood screws extend substantially parallel with the axis of the bolt and are arranged substantially equidistantly apart with respect to each other and circumferentially with respect to the bolt. The pointed ends of the wood screws constitute the primary cleaning means for the rotary cleaning device. However, the threads which extend from the pointed ends of the wood screws rearwardly also constitute a secondary cleaning means which may be of assistance in cleaning the sides of the combustion chamber.

DESCRIPTION OF THE PREFERRED EMBODIMENT

Figure 1:
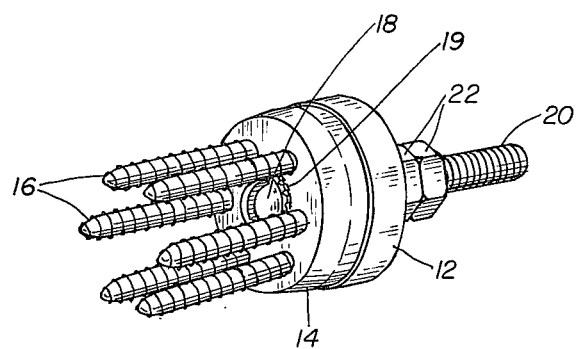
FIG. 1 is a perspective view of a rotary cleaning device constructed in accordance with the principles of the present invention.
Figure 2:
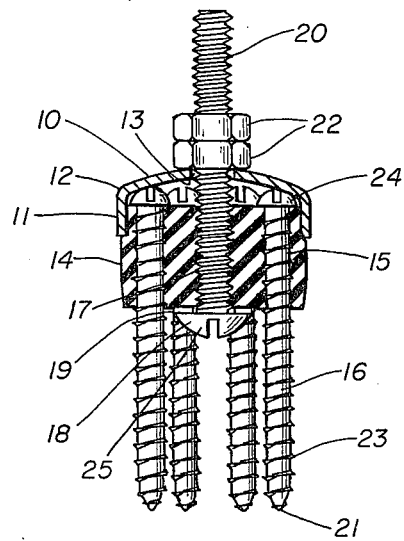
FIG. 2 is a longitudinal cross-sectional view of the device shown in FIG. 1.

Referring to the drawings in detail, the rotary cleaning device of the present invention includes a resilient cylinder 14 which may be constructed of rubber or plastic or other similar materials. The cylinder 14 is provided with a plurality of axially extending and circumferentially arranged holes or apertures 15 therein and a centrally located hole or bore 17 therethrough. A plurality of substantially parallel and rigid cleaning elements 16 pass through the holes 15 of the resilient mounting 14 and protrude outwardly and beyond as shown. The outer or lower ends of the cleaning element 16, as best shown in FIG. 2, are pointed as at 21. The opposite ends of the cleaning elements 16 are provided with enlarged heads 24 which rest against the top side or surface of the resilient mounting 14. The cleaning elements 16 can be made of any suitable material provided, however, that they are rigid. In the form shown in the drawings, these cleaning elements 16 are in the form of elongated wood screws which have an external threaded portion 23; these elements 16 are shown in the form of wood screws purely by way of example and without imposing any limitations upon the invention disclosed herein.

The resilient mounting 14 is adapted to engage a base member 12 which is comprised of a retaining disc 10 having a circumferential lip 11 thereon. As shown, therefore, the base member is in the form of a cup in which the cylindrical resilient mounting 14 is received.

A bolt 18 passes through the central bore 17 of the resilient cylinder 14 and through a central hole 13 in the cup-shaped base member 12. A lock washer 19 is received on the bolt 18 between the head 25 of the bolt 18 and the resilient mounting 14. The bolt 18 has an upwardly extending shank portion 20 which, as will hereinafter appear, constitutes the means for engaging the chuck of a drill (not shown) or the like. Nuts 22 are received on the threaded shank 20 adjacent the upper exterior portion of the base member 12. The lower nut 22 (referring to FIG. 2) is tightened to pull the resilient mounting 14 upwardly into the cup-shaped base member 12 until the heads 24 of the cleaning member 16 are firmly grasped between the lower interior surface of the base member 12 and the upper surface of the resilient mounting 14; the lock washer 19 will prevent the turning of the bolt 18 while the lower nut 22 is tightened. The upper nut 22 is thereafter employed as a lock nut. The holes 15 in the resilient mounting 14 are so arranged that the cleaning elements are substantially equidistant from each other and are circumferentially arranged and parallel with the bolt 18.

The points 21 on the cleaning elements 16 constitute the primary cleaning means and are particularly adapted for working against relatively flat surfaces. On the other hand, the threaded portions 23 constitute secondary cleaning means and can be used for simultaneously cleaning the cylindrical wall of a combustion chamber while the points 21 are used to clean the exposed surface of the piston.

As indicated above, the cleaning elements may, for example, be of the configuration of wood screws, but it should be obvious that these cleaning elements could be made in other configurations. Whereas wood screws are typically provided with helical threads such as the threads 23 shown on the drawings, and whereas these threads sometimes aid in the cleaning operation where the sides of the cleaning elements may engage a cylindrical wall, for example, the cleaning elements may be of relatively smooth external surface with pointed ends. In this regard, the pointed ends need not necessarily be single points, but might be bifurcated, etc.

Although the drawings show a single ring or circumference of cleaning elements, it should be obvious that additional cleaning elements could be employed with these cleaning elements being radially or interdigitally located with respect to those shown on the drawings. For smaller applications, such as carbon removal from internal combustion engine cylinders and heads, the illustrated embodiment is deemed to be sufficient. However, for larger applications, such as removing mortar from bricks, several rings of elements might be employed. The present invention is intended for use by the insertion of the shank portion 20 in the chuck of a hand drill. However, for larger applications, such as scale removal from large plates, etc., other methods of introducing rotary motion might be utilized.

Again, although the base member 12 is shown in the form of a cup-shaped member, the rim portion 11 could be eliminated so that the base member was in the form of a disc 10. It is further contemplated, with the right type of bonding techniques between the elements, the bolt 18 might be embedded directly in the resilient mounting 14 without the use of the base member 12. As shown in the drawings, the cleaning elements 16 would be removable from the resilient mounting 14 and, thus, could be replaced if the cleaning element 16 became worn, broken or were initially defective; however, it might be desirable to have the cleaning elements 16 permanently bonded or secured within the resilient mounting 14.

Whereas the present invention has been described in particular relation to the drawings attached hereto, it should be understood that other and further modifications, apart from those shown or suggested herein, may be made within the spirit and scope of this invention.

What is claimed is:

1. A rotary cleaning device for removing hard deposits from the combustion chambers of internal combustion engines comprising a rotatable resilient cylindrical mounting, a cup-shaped base member disposed on one side of said resilient mounting and receiving said resilient mounting therein, a bolt passing through said resilient mounting and said base member, said bolt being substantially centrally located with respect to both said resilient mounting and said rotatable base member, said bolt having an enlarged head engaging a side of said resilient mounting opposite from said one side thereof, nut means on said bolt engagable with said rotatable base member for urging said rotatable base member towards said one side of said resilient mounting, said bolt having a portion extending from the head thereof beyond said nut means and constituting a shank means for engagement with a rotary chuck to rotate said resilient mounting, a plurality of rigid and elongated cleaning elements of substantially equal length mounted in said resilient mounting and extending through and beyond said opposite side of said resilient mounting, said cleaning elements being substantially parallel to and circumferentially arranged with respect to said bolt, said cleaning elements having cleaning means at the ends thereof extending beyond said resilient mounting, each cleaning element being provided with an enlarged head means at the end thereof opposite from said cleaning means, said cleaning elements being mounted in said resilient mounting such that the enlarged head means thereof are grasped between said one side of said resilient mounting and said base member, said cleaning means at the ends of said cleaning elements being in the form of pointed ends adapted to clean the exposed surface of a piston within the combustion chamber, said cleaning elements being longitudinally threaded rearwardly from the pointed ends thereof to provide additional lateral cleaning means adapted to clean the cylindrical walls of the combustion chamber.

* * * * *